(12) United States Patent
Showalter

(10) Patent No.: US 6,802,794 B2
(45) Date of Patent: Oct. 12, 2004

(54) SINGLE ACTUATOR LOST MOTION SHIFT ASSEMBLY

(75) Inventor: Dan Joseph Showalter, Plymouth, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 10/371,420

(22) Filed: Feb. 21, 2003

(65) Prior Publication Data

US 2004/0163916 A1 Aug. 26, 2004

(51) Int. Cl.[7] .................... F16H 3/44; F16D 21/00; F16D 28/00
(52) U.S. Cl. ............... 475/269; 192/48.2; 192/48.5; 192/84.6; 192/84.7
(58) Field of Search ............... 192/48.2, 48.5, 192/48.7, 84.6, 84.7; 475/204, 269; 74/473.37; 180/248, 251

(56) References Cited

U.S. PATENT DOCUMENTS

| 4,846,010 | A | * | 7/1989 | Fujikawa et al. ......... 74/337.5 |
| 5,330,030 | A | | 7/1994 | Eastman et al. |
| 5,363,938 | A | | 11/1994 | Wilson et al. |
| 5,400,866 | A | | 3/1995 | Wilson et al. |
| 5,584,776 | A | * | 12/1996 | Weilant et al. ............. 192/48.2 |
| 5,655,618 | A | | 8/1997 | Wilson et al. |
| 5,867,092 | A | | 2/1999 | Vogt |
| 5,878,624 | A | | 3/1999 | Showalter et al. |
| 5,984,821 | A | | 11/1999 | Showalter |
| 5,992,592 | A | | 11/1999 | Showalter |
| 6,000,488 | A | | 12/1999 | Atkinson |
| 6,101,897 | A | | 8/2000 | Showalter |
| 6,173,624 | B1 | | 1/2001 | Decker |
| 6,203,465 | B1 | * | 3/2001 | Showalter .................... 475/204 |
| 6,211,794 | B1 | * | 4/2001 | DeSoto .................... 340/686.1 |
| 6,381,530 | B1 | * | 4/2002 | Vogt ............................ 701/69 |
| 6,398,686 | B1 | * | 6/2002 | Irwin ........................ 192/84.6 |
| 6,645,109 | B2 | * | 11/2003 | Williams et al. ............ 475/204 |
| 2002/0142877 | A1 | * | 10/2002 | Williams et al. ............ 180/248 |
| 2003/0032519 | A1 | * | 2/2003 | Lovatt ........................ 475/204 |

FOREIGN PATENT DOCUMENTS

JP 2000-205411 A * 7/2000

* cited by examiner

Primary Examiner—Rodney H. Bonck
(74) Attorney, Agent, or Firm—Brinks Hofer Gilson & Lione; Greg Dziegielewski

(57) ABSTRACT

A shift assembly for a two-speed transfer case utilizes a single actuator to drive both the speed range selection mechanism and a modulating friction clutch pack which selectively transfers drive torque from a primary output to a secondary output. The shift assembly includes an actuator which rotates a shift rail and cam having an intermediate helical track and a dwell region at each end. A lost motion assembly operating in conjunction with the helical cam selectively engages and disengages the clutch when the cam follower is in one of the two dwell regions. Thus, the shift assembly provides sequential operation from full clutch engagement in a first speed range, clutch disengagement in the first speed range, de-selection of the first speed range, selection, and de-selection of neutral, selection of a second speed range and, up to full engagement of the clutch in the second speed range.

18 Claims, 6 Drawing Sheets

SINGLE ACTUATOR LOST MOTION SHIFT ASSEMBLY

BACKGROUND OF THE INVENTION

The invention relates generally to shift assemblies for transfer cases and more specifically to a single actuator shift assembly for a transfer case which sequences selection and operation of both a two-speed gear reduction assembly and modulating clutch.

In the majority of four-wheel drive vehicles, particularly pickup trucks and sport utility vehicles (SUV's), a transfer case is utilized to provide drive torque to a secondary vehicle driveline in response to operator inputs and automatic, adaptive drive systems. Such transfer cases may include (1) a center differential which allows speed differences between the primary and secondary drivelines, (2) a clutch which may either inhibit differentiation of a center differential, if the transfer case is so equipped, as noted above, or provide drive torque from the primary driveline to the secondary driveline if the transfer case lacks a center differential and (3) a speed reduction assembly, typically a planetary gear mechanism, to provide a low or reduced speed operating mode when it is engaged in addition to a high speed or direct drive operating mode.

Both the modulating clutch and the speed reduction assembly require an operator or actuator of some type to select and engage them in accordance with the operator's desire or the command of an automatic, adaptive drive system as noted above.

Various speed reduction assembly actuators are disclosed in U.S. Pat. Nos. 5,878,624 and 6,173,624 co-owned by the assignee. U.S. Pat. No. 5,407,024 discloses both a range selection actuator and a ball ramp friction pack clutch operator.

Other transfer cases such as those disclosed in U.S. Pat. Nos. 5,330,030 and 5,363,938 have utilized a single actuator to effect both speed range selection and clutch engagement. In the latter two patents, an electric actuator provides both speed range selection and activation of a friction clutch pack. However, operating force for the clutch pack is generated through a cam and second class lever arrangement which requires that the electric actuator generate significant operated energy. Generation of such energy suggests that both the size of the actuator and its power consumption will be significant. This, in turn, suggests that improvements in single actuator transfer cases are both desirable and possible.

SUMMARY OF THE INVENTION

A shift assembly for a two-speed transfer case utilizes a single actuator to drive both the gear or speed range selection mechanism and a modulating friction clutch pack which selectively transfers drive torque from a primary transfer case output to a secondary transfer case output. The shift assembly includes an actuator which rotates a shift rail and cam having an intermediate helical track and a dwell region at each end. A lost motion assembly operating in conjunction with the helical cam selectively engages and disengages the friction clutch pack when the cam follower is in one of the two dwell regions. Thus, the shift assembly provides sequential operation from full clutch engagement in a first speed range through clutch disengagement in the first speed range, de-selection of the first speed range and selection of neutral, de-selection of neutral and selection of the second speed range and thence increasing engagement, up to full engagement, of the friction clutch pack in the second speed range. If desired, the transfer case may include an interaxle differential.

Thus, it is an object of the present invention to provide a transfer case having a two-speed gear reduction assembly and a modulating clutch which are both controlled by a single actuator assembly.

It is a further object of the present invention to provide a two-speed transfer case having a modulating clutch with a single actuator shift mechanism which sequences clutch engagement, clutch disengagement and selection of a desired speed range and neutral.

It is a still further object of the present invention to provide a transfer case having a two-speed gear reduction assembly, interaxle differential and modulating clutch having a single actuator for sequentially controlling selection of a speed range and engagement of the modulating clutch.

Further objects and advantages of the present invention will become apparent by reference to the following description of the preferred embodiment and appended drawings wherein like reference numbers refer to the same component, element or feature.

DETAILED DESCRIPTION OF THE PREFERRED EMBODIMENT

Figure 1:
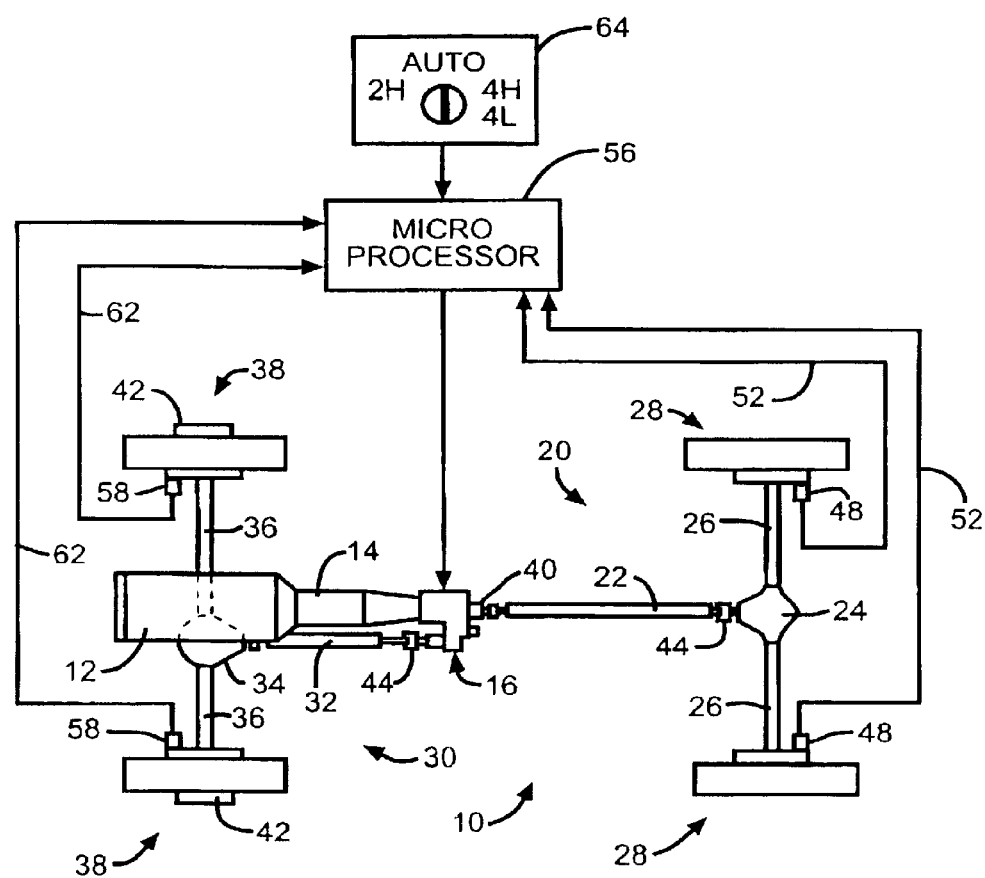
FIG. 1 is a diagrammatic view of a drive assembly of a four wheel drive motor vehicle incorporating the present invention.

Referring now to FIG. 1, a four-wheel vehicle drive train utilizing the present invention is diagramatically illustrated and designated by the reference number 10. The four-wheel vehicle drive train 10 includes a prime mover 12 which is coupled to and directly drives a transmission 14. The output of the transmission 14 directly drives a transfer case assembly 16 which provides motive power to a primary or rear drive driveline 20 comprising a primary or rear prop shaft 22, a primary or rear differential 24, a pair of live primary or rear axles 26 and a respective pair of primary or rear tire and wheel assemblies 28.

The transfer case assembly 16 also selectively provides motive power to a secondary or front driveline 30 comprising a secondary or front prop shaft 32, a secondary or front differential 34, a pair of live secondary or front axles 36 and a respective pair of secondary or front tire and wheel assemblies 38. The front tire and wheel assemblies 38 may be directly coupled to a respective one of the front axles 36 or, if desired, a pair of manually or remotely activatable locking hubs 42 may be operably disposed between each of the front axles 36 and a respective one of the tire and wheel assemblies 38 to selectively couple same. Finally, both the primary driveline 20 and the secondary driveline 30 may include suitable and appropriately disposed universal joints 44 which function in conventional fashion to allow static and dynamic offsets and misalignments between the various shafts and components.

Disposed in sensing relationship with each of the rear tire and wheel assemblies 28 is a wheel speed sensor 48. Preferably, the wheel speed sensors 48 may be the same sensors utilized with, for example, an antilock brake system (ABS) or other vehicle control or traction enhancing system. Alternatively, a single sensor, disposed to sense rotation of the primary or rear prop shaft 22 may be utilized. Signals from the sensors 48 are provided in lines 52 to a microprocessor 56. Similarly, disposed in sensing relationship with the front tire and wheel assemblies 38 are respective wheel speed sensors 58 which provide signals to the microprocessor 56 in lines 62. Once again, the sensors 58 may be a part of or shared with an antilock brake system or other traction control system.

Typically, an operator selectable switch 64 may be utilized and is generally disposed within reach of the vehicle operator in the passenger compartment (not illustrated). The switch 64 may be adjusted to select various operating modes such as two-wheel high gear, automatic, i.e., on-demand or adaptive operation, four-wheel high gear or four-wheel low gear depending upon the particular vehicle and configuration of the transfer case assembly 16. One such system which provides torque delivery to the secondary driveline 30 in increments or decrements in response to a sensed wheel speed difference between the primary driveline 20 and the secondary driveline 30 is disclosed in U.S. Pat. No. 5,407,024.

Figure 2:
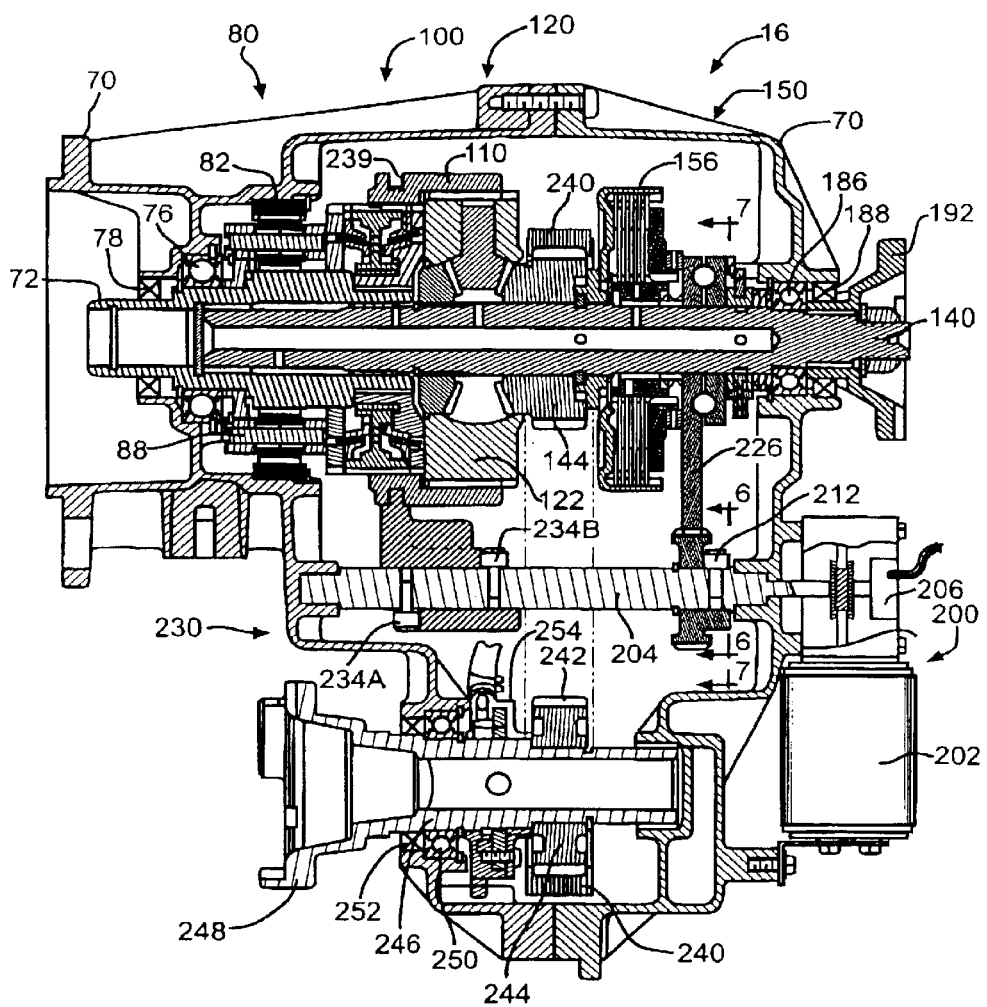
FIG. 2 is a side elevational view in full section of a transfer case having a lost motion shift actuator according to the present invention.
Figure 3:
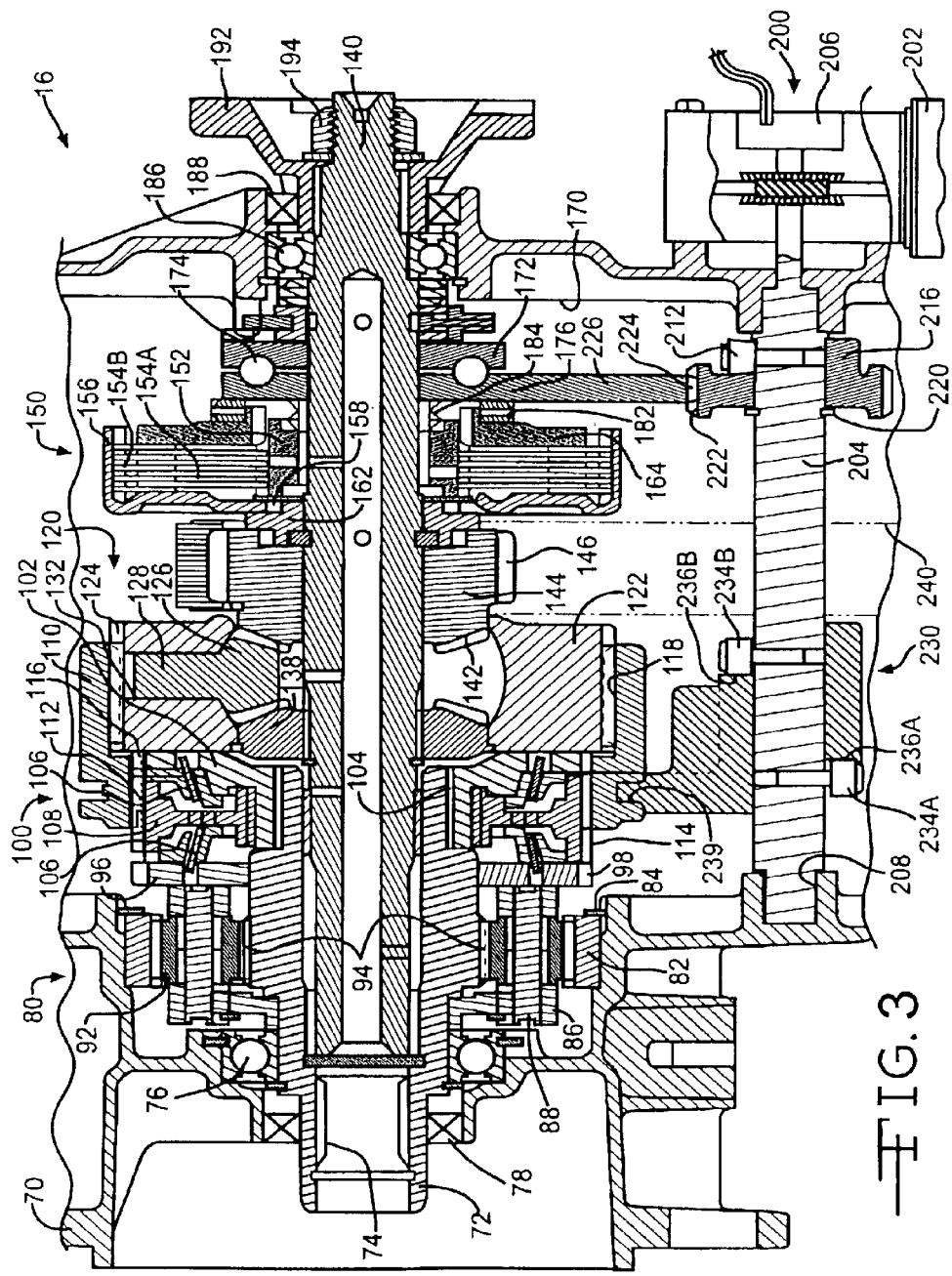
FIG. 3 is an enlarged, fragmentary view in full section of a transfer case incorporating a lost motion shift assembly according to the present invention.

Referring now to FIGS. 2 and 3, the transfer case assembly 16 includes a multiple piece metal housing 70 having various cast and machined surfaces, flats, openings, flanges and bores for receiving various internal components of the transfer case assembly 16 as will be readily appreciated. The transfer case assembly 16 includes an input shaft 72 having a plurality of female splines or gear teeth 74 disposed upon an inner surface and engageable by complementarily configured male splines or gear teeth disposed upon an output shaft (not illustrated) of the transmission 14 (illustrated in FIG. 1). The input shaft 72 is rotatably supported by an anti-friction bearing such as a ball bearing assembly 76. An oil seal 78 provides a suitable fluid tight seal between the input shaft 72 and the housing 70.

The transfer case assembly 16 also includes a planetary gear speed reduction assembly 80 having a stationary ring gear 82 which is retained within the transfer case housing 70 by a snap ring 84 or other suitable retaining device. A planetary gear carrier 86 is generally aligned with the ring gear 82 and includes and supports a plurality of fixed stub shafts 88 which freely rotatably support and retain a like plurality of pinion gears 92. Each of the pinion gears 92 engage the teeth of a sun gear 94 which may be integrally formed with the input shaft 72 or may be a separate component coupled thereto by, for example, splines. Secured to the carrier 86 of the planetary gear assembly 80 is a circular disc 96 having peripheral splines or gear teeth 98. The planetary gear speed reduction assembly 80 thus provides a reduced speed output to the carrier 86 and the circular disc 9

Adjacent the planetary gear speed reduction assembly 80 is a synchronizer assembly 100. The synchronizer assembly 100 receives the reduced speed output of the planetary gear assembly 80 and the disc 96 as well as a direct input from a drive collar 102 driven by the input shaft 72 through a set of inter-engaging splines 104. The synchronizer assembly 100 is conventional and includes obliquely oriented friction or clutch faces 106 disposed between a center drive member 108. An annular clutch collar 110 includes a plurality of female or internal splines or gear teeth 112 which are in constant engagement with a plurality of complementarily configured male splines or gear teeth 114 on the center drive member 108. When the annular clutch collar 110 resides in the position illustrated in FIG. 3, the splines or gear teeth 112 engage complementarily configured male splines or gear teeth 116 on the drive collar 102 coupled to the input shaft 72. As the annular clutch collar 110 is moved to an extreme left position, the female splines or gear teeth 114 engage the male splines or gear teeth 98 on the disc 96. In this position, a low gear or reduced speed drive is achieved. The annular clutch collar 110 may be moved to a neutral position intermediate the left and right positions just described wherein the other components of the transfer case assembly 16 are not driven. The annular clutch collar 110 also includes female or internal splines or gear teeth 118 which engage components of an interaxle differential assembly 120.

The interaxle differential assembly 120 includes a generally conventional cylindrical housing 122 having male splines or gear teeth 124 disposed about its periphery. The annular shift collar 110 is thus in constant engagement with the housing 122 of the interaxle differential assembly 120 by virtue of the engagement of the splines or gear teeth 118 and 124. The interaxle differential assembly 120 includes a plurality of beveled drive gears 126 which are formed integrally with or disposed upon stub shafts 128 which are freely rotatably received within suitable radially extending bores 132 formed in the housing 122 of the differential assembly 120.

Engaging the plurality of drive gears 126 on the left side as illustrated in FIG. 3 is a first beveled output gear 138 which is splined to and therefore rotates with a primary output shaft 140. Symmetrically disposed with the first beveled output gear 138 on the right side of the beveled drive gears 126 is a second beveled output gear 142 which is formed upon a portion of a chain drive sprocket 144 having chain drive teeth 146. The chain drive sprocket 144 is freely rotatably disposed upon the primary output shaft 140.

The chain drive sprocket 144 is also coupled to and rotates with the output of a modulating friction clutch pack assembly 150. The modulating friction clutch pack assembly 150 includes an input hub or collar 152 which is splined to the primary output shaft 140 and rotates therewith. A first plurality of clutch plates 154A are splined to and driven by the input hub or collar 152 and are interleaved with a second plurality of friction clutch plates 154B which are splined and interconnected to a bell housing 156. The friction clutch plates 154A and 154B include suitable clutch facing material (not illustrated) on their adjacent faces. The bell housing 156 is rotationally coupled to the chain drive sprocket 144 through inter-engaging splines 158 and an intermediate collar 162. Thus, the bell housing 156 rotates with the chain drive sprocket 144 and actuation of the friction clutch pack 150 drives the speeds of the primary output shaft 140 and the chain drive sprocket 144 into synchronism and inhibits operation of the interaxle differential assembly 120.

The modulating friction clutch pack assembly 150 also includes an apply plate 164 disposed adjacent the interleaved clutch plates 154A and 154B. Adjacent the apply plate 164 is a ball ramp actuator assembly 170. The ball ramp actuator assembly 170 includes a first, fixed circular member 172 which defines a plurality of aligned, arcuate, tapering recesses which receive a like plurality of load transferring balls 174. Disposed in opposed relationship with the first circular member 172 is a second, rotatable circular member 176 having a like plurality of arcuate, tapering recesses 178 which are mirror images of those in the first circular member 172. Between the apply plate 164 and the second circular member 176 is a thrust bearing 182 which transmits axial force between the second circular member 176 and the apply plate 164 but permits the apply plate 164 to freely rotate. Rotation of the second circular member 176 from a center position causes the load transferring balls 174 to move to shallower regions of the recesses 178, thereby driving the second circular member 176 to the left as illustrated in FIG. 3. It will be appreciated that analogous mechanical devices such as tapered roller bearings in complementary recesses or devices such as opposed cams which provide axial motion upon relative rotation may replace the balls 176 and recesses 178. A plurality of springs 184 such as Belleville springs or wave washers, is disposed between the clutch collar or hub 152 and the second circular member 176 and provides a biasing or restoring force which drives the second circular member 176 to the right as illustrated in FIG. 3.

The right end of the primary output shaft 140 is preferably supported by an anti-friction bearing such as a ball bearing assembly 186 and an oil seal 188 provides a suitable seal between an output flange 192 secured to the primary output shaft 140 by a threaded nut 194 and the housing 70 of the transfer case assembly 16.

Figure 4:
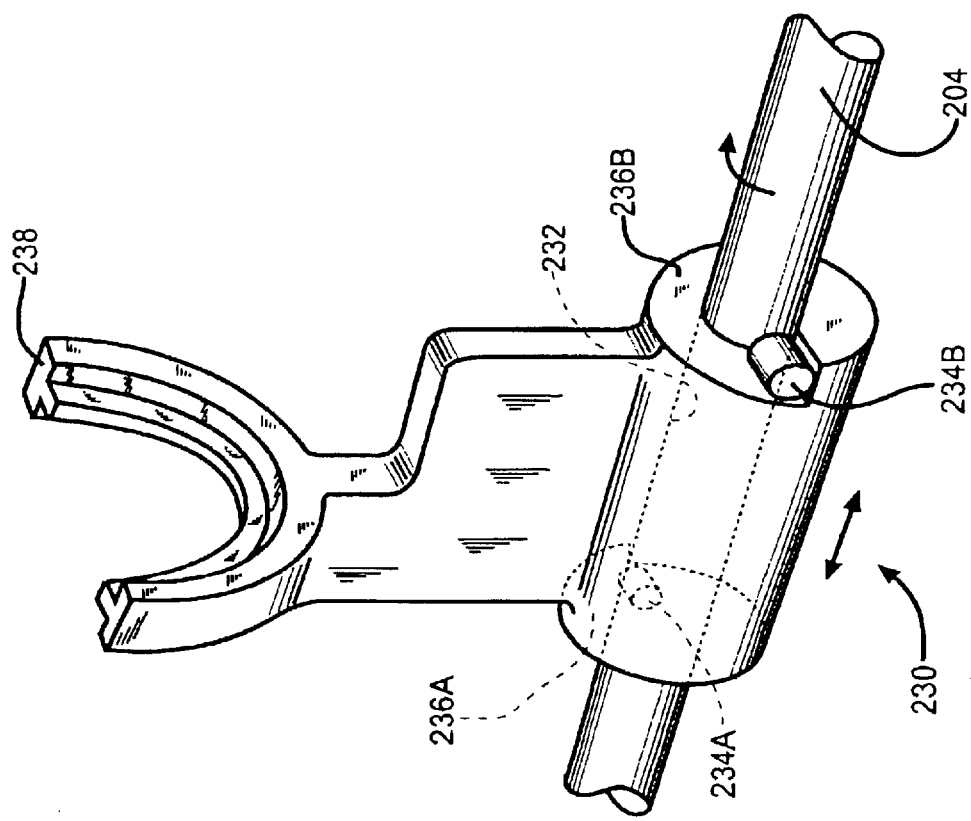
FIG. 4 is a perspective view of a shift fork and cam assembly of a lost motion shift assembly according to the present invention.
Figure 7:
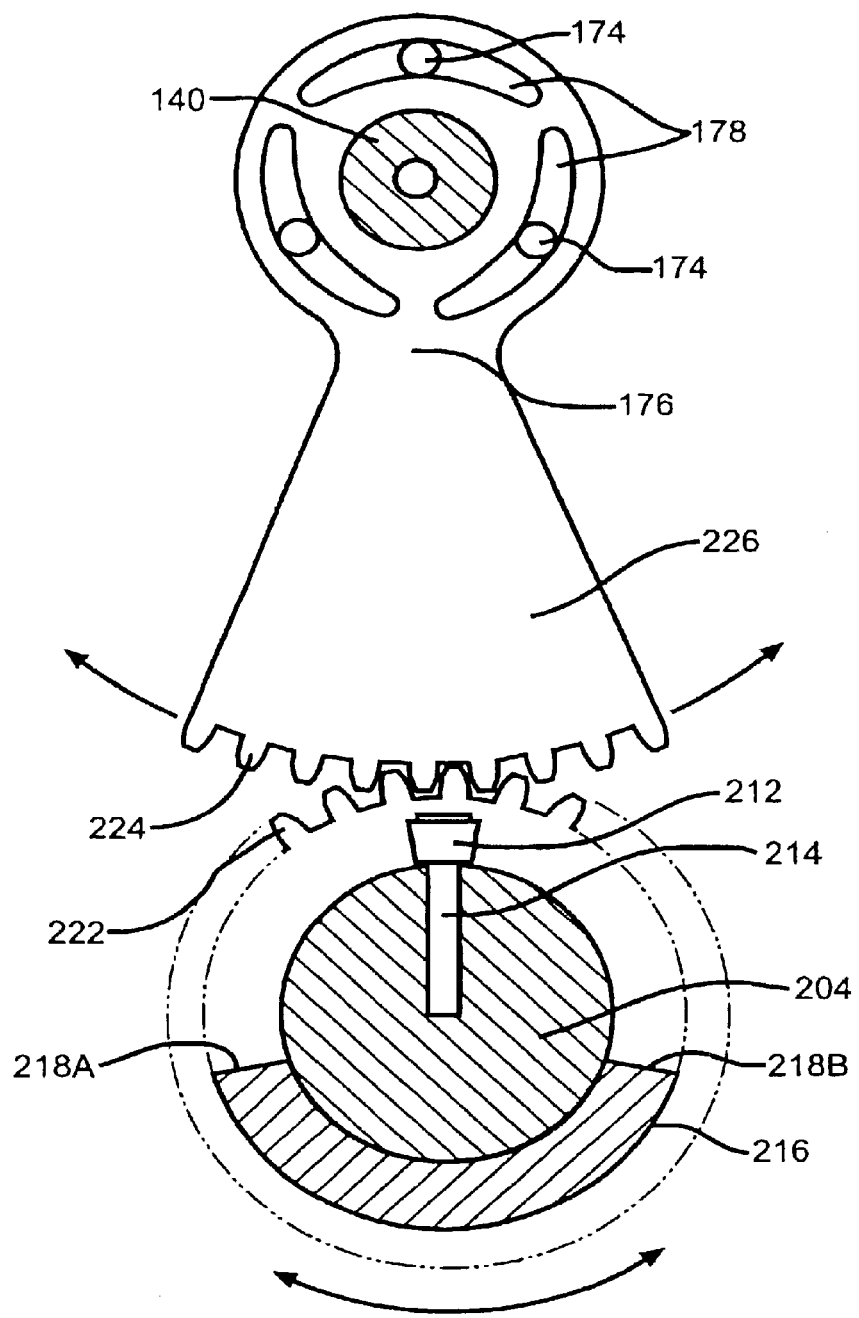
FIG. 7 is an enlarged, fragmentary, full sectional view of a lost motion shift assembly according to the present invention taken along line 7—7 of FIG. 2.

Turning now to FIGS. 3, 4 and 7, the lost motion shift assembly 200 will now be described. The lost motion shift assembly 200 includes a bi-directional electric drive motor 202 which may include a direct drive or drive through a worm gear or similar speed reducing mechanism to a bi-directionally rotating shift rail 204. The shift assembly 200 includes a position sensing assembly 206 which may be a pulse counting device, may include contact tracks, Hall effect sensors or other sensing devices capable of providing real time information regarding the angular position of the shift rail 204 to the microprocessor 56. The end of the bi-directionally rotating shift rail 204 opposite the drive motor 202 is received within a suitable counterbore 208 formed within the housing 70 of the transfer case assembly 16.

A projection or freely rotatable cam roller or follower 212 is mounted upon a radially oriented pin 214 which is securely received within the shift rail 204. A spur gear 216 is freely rotatably disposed upon the shift rail adjacent the cam follower 212 and defines a pair of axially extending steps or shoulders 218A and 218B which are approximately 200° apart. The spur gear 216 is held in position on the shift rail 204 by a snap ring 220 which is received within a suitable channel formed in the shift rail 204. About the periphery of the spur gear 216 are gear teeth 222 which are in constant mesh with gear teeth 224 on a sector plate 226 which extends radially from the second circular member 176. It will be appreciated that the spur gear 216, the sector plate 226 and the meshing teeth 224 and 226 may be replaced with analogous mechanical devices such as, for example, a chain and pair of sprockets (not illustrated).

Referring now to FIGS. 3 and 4, also disposed upon the shift rail 204 is a shift fork assembly 230. The shift fork assembly 230 defines an axial bore 232 which freely rotatably receives the shift rail 204. The shift fork assembly 230 is disposed upon the shift rail 204 between a pair of cam followers-234A and 234B which engage similarly configured complex cams 236A and 236B, respectively. Both of the complex cams 236A and 236B include flat or dwell regions adjacent both ends of travel and intermediate, helical regions as diagrammatically illustrated in FIG. 5. Thus, upon rotation of the shift rail 204 no axial motion of the shift fork assembly 230 is imparted from one limit of travel while the cam followers 234A and 234B traverse the dwell regions of the respective cams 236A and 236B. During the intermediate, helical regions of the complex cams 236A and 236B, the shift fork assembly 230 is axially translated. Then, in the second or remaining dwell portion of the complex cams 236A and 236B, no further axial translation is imparted to the shift fork assembly 230 as the shift rail 204 rotates. The shift fork assembly 230 includes a yoke or fork 238 which engages a peripheral channel or groove 239 in the annular clutch collar 110.

Referring again to FIG. 2, the chain drive sprocket 144 and specifically the teeth 146 engage and drive a continuous chain 240 which engages and drives gear teeth 242 on a driven chain sprocket 244. The driven chain sprocket 244 is secured by inter-engaging splines, an interference fit or other positive means of connection to a secondary output shaft 246. The secondary output shaft 246 includes a flange 248 or other component which may be a portion of the universal joint 44 which is coupled to the prop shaft 32 as illustrated in FIG. 1. An anti-friction assembly such as a ball bearing assembly 250 supports one end of the secondary output shaft 246. An oil seal 252 disposed between the housing 70 and the secondary output shaft 246 provides a suitable fluid tight seal therebetween. A gerotor pump 254 is driven by the secondary output shaft 246 and provides a flow of cooling and lubricating fluid to the various components of the transfer case 16 disposed along the primary output shaft 140.

Figure 5:
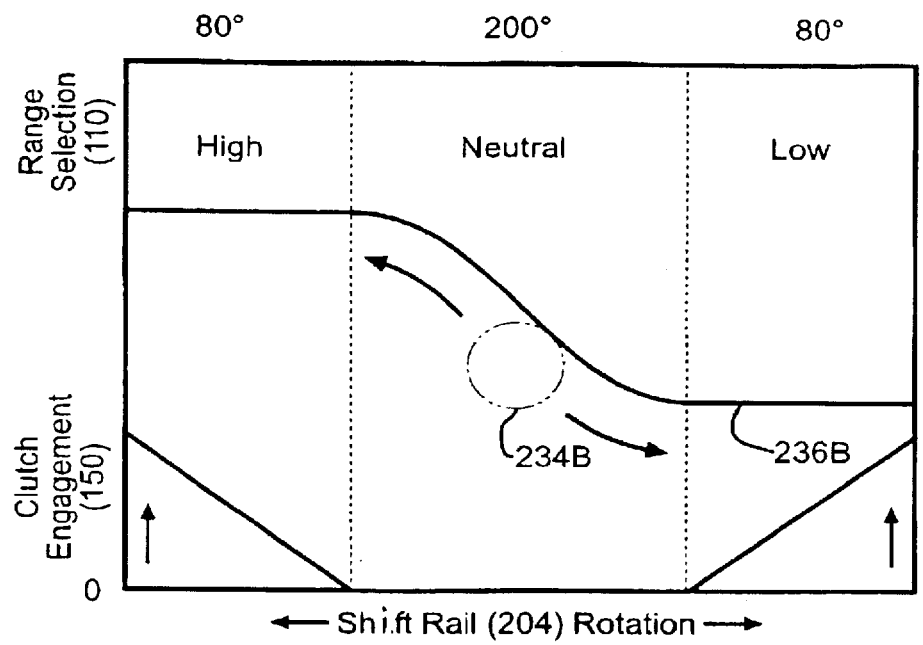
FIG. 5 is a graph illustrating clutch engagement and shaft rotation in a lost motion shift assembly according to the present invention.
Figure 6:
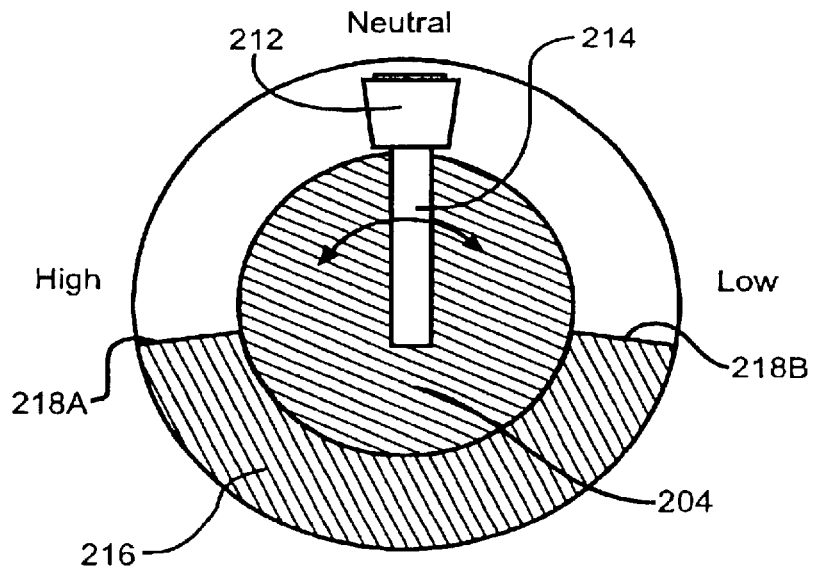
FIG. 6 is an enlarged, sectional view of a portion of a lost motion shift assembly according to the present invention taken along line 6—6 of FIG. 2.

With reference now to all of the drawing figures and particularly FIG. 5, operation of the lost motion shift assembly 200 according to the present invention and the transfer case assembly 16 will be described. As a starting point and purely for the purpose of reference, it will be assumed that the assembly 200 commences operation in the position illustrated in FIGS. 6 and 7. The position illustrated in FIGS. 6 and 7 represents the neutral position of the annular shift collar 110, the shift rail 204 and the shift fork assembly 230. As the shift rail 204 rotates from the neutral position in a counterclockwise direction as illustrated in FIGS. 6 and 7, the cam followers 234A and 234B are in the helical region of the cams 236A and 236B, respectively, and translate the shift fork assembly 230 and the annular shift collar 110 to the right, to the position illustrated in FIG. 2 and engage or provide high or direct drive from the input shaft 72 to the interaxle differential assembly 120. Engagement of high or direct drive is facilitated by the synchronizer assembly 100. As the shift rail 204 continues to rotate, no further motion of the shift fork assembly 230 occurs as the cam followers 234A and 234B are now operating in the dwell regions of the cams 236A and 236B, as illustrated in FIG. 5.

However, at the time the cam followers 234A and 234B move from the helical regions of the cams 236A and 236B to the dwell regions, the cam roller or follower 212 contacts or engages the step or shoulder 218A of the gear 216 and begins to rotate the gear 216 which is coupled to the second circular member 176 through the sector plate 226 and gear teeth 224 and 222. As the second circular member 176 rotates, it begins to axially translate as the load transferring balls 174 move to shallower regions of the recesses 178. Axial motion of the second circular member 176 toward the friction clutch pack assembly 150 commences frictional engagement of the plates 154A and 154B of the friction clutch pack assembly 150 and begins to drive the speeds of the primary output shaft 140 and the secondary output shaft 246 into synchronism. Also, as noted above, such frictional coupling increasingly inhibits differentiation by the interaxle differential assembly 120. At the limit of counterclockwise travel of the shift rail 204, the friction clutch pack assembly 150 will be fully engaged and transmit torque and inhibit differentiation by the interaxle differential assembly 120 at its maximum level. Rotation of the shift rail 204 in the clockwise direction first of all relaxes the frictional coupling achieved through the friction clutch pack assembly 150 which is further assisted by action of the plurality of springs 184.

As the shift rail 204 continues to rotate clockwise, the cam followers 234A and 234B enter the helical regions of the cams 236A and 236B and begin to translate the shift fork assembly 230 and the annular clutch collar 110 to the left. The annular collar 110 moves to a neutral position where the electric motor 202, the shift rail 204, the shift fork assembly 230 and the annular clutch collar 110 may be stopped. The transfer case assembly 16 is then in its neutral position.

If rotation of the shift rail 204 continues, the shift fork 230 translates the annular shift collar 110 to its leftmost position where it couples the circular disc 96, which provides the reduced speed output of the planetary gear assembly 80, to the interaxle differential assembly 120. Such a shift will of course, again be facilitated by action of the synchronizer assembly 100. As the shift rail 204 continues to rotate, cam follower 234A and 234B will complete traverse of the helical regions of the cams 236A and 236B and the cam followers 234A and 234B will enter the dwell regions as illustrated in FIG. 5.

No further motion of the annular clutch collar 110 will occur notwithstanding continued rotation of the shift fork 204. Such continued rotation of the shift fork 204 will cause the cam follower 212 to engage the step or ledge 218B on the gear 216 and begin to rotate the gear 216, the sector plate 226 and the second circular member 176 to again commence compression of the friction clutch pack assembly 150 and torque transfer therethrough. Continued rotation of the shift rail 204 will compress the friction clutch pack assembly 150, eventually providing maximum torque transfer therethrough, synchronization of the primary output shaft 140 with the secondary output shaft 246 and inhibition of differentiation by the interaxle differential 120. Reactivation of the friction clutch pack assembly 150 may be achieved by counterclockwise rotation of the shift rail 204. If such rotation is continued, the annular shift collar 110 will soon return to its neutral position.

While the foregoing description illustrates operation of the lost motion shift assembly 200 in a continuous manner, it should be appreciated that the electric drive motor 202 may be operated in short or long intervals or increments and that the sequence of operation illustrated in FIG. 5 and described above may occur in small or large increments in either direction in response to operator command or sensed vehicle operating conditions provided, for example, by the wheel speed sensors 48 and 58 or other signals to the microprocessor 56 from, for example, the operator selectable switch 64. For example, selection of the low gear will typically be under the control of the driver whereas the extent of operation of the friction clutch pack assembly 150 may occur automatically through action of the microprocessor 56 based upon inputs provided thereto. It should be understood that the friction clutch pack assembly 150 is a modulating assembly, as noted above, and thus that the electric motor 202 may be selectively activated to move the shift rail 204, the gear 216, the sector plate 226 and the second circular member 176 to a desired position to transfer a desired level of torque through the friction clutch pack assembly 150.

The foregoing disclosure is the best mode devised by the inventor for practicing this invention. It is apparent, however, that products and methods incorporating modifications and variations will be obvious to one skilled in the art of shift assemblies and operating methods therefor. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

What is claimed is:

1. A twin clutch controller assembly comprising, in combination,
    a first clutch for selectively engaging a first driven member with one of a pair of drive members,
    a second clutch for providing modulating engagement between said first driven member and a second driven member,
    a rotatable shift rail having at least one cam follower,
    a driver for bi-directionally rotating said shift rail,
    a shift fork adapted to translate said first clutch, said shift fork disposed adjacent said cam follower and defining at least one cam having active, helical and inactive, dwell regions,
    a cam actuator adapted to generate and apply compressive force to said second clutch, and
    an assembly driven by said shift rail and adapted to activate said cam actuator when said cam follower is in said inactive, dwell region of said cam and to release said actuator when said cam follower is in said active, helical region of said cam, said assembly including a gear having spaced apart shoulders engaged by a projection on said shift rail and a sector plate engaged by said gear and driving said cam actuator.

2. The twin clutch controller of claim 1 further including a speed reducing assembly having a reduced speed output, wherein said reduced speed output is one of said pair of drive members.

3. The twin clutch controller of claim 1 further including an interaxle differential having an input driven by said first driven member of said clutch.

4. The twin clutch controller of claim 1 further including a microprocessor and a sensor for providing a signal to said microprocessor indicating the angular position of said shift rail.

5. The twin clutch controller of claim 1 wherein said second clutch is a friction pack clutch assembly.

6. The twin clutch controller of claim 1 wherein said driver includes an electric motor.

7. A lost motion shift assembly comprising, in combination,
    a first clutch for selectively driving a first output from one of two drive members,
    a shift rail having at least one cam follower disposed thereupon,
    a motor for bi-directionally rotating said shift rail,
    a shift fork disposed on said shift rail and defining at least one cam in cooperating relationship with said cam follower, said cam defining a pair of dwell regions and an intermediate helical region, a second clutch for providing modulating engagement between said first output and a second output, a lost motion mechanism including a projection on said shift rail and a drive member disposed on said shift rail and having a pair of spaced-apart shoulders engageable by said projection, and an actuator coupled to said drive member and adapted to actuate said second clutch, whereby said first clutch is translated between said two drive members while said projection moves between said pair of shoulders and said second clutch is actuated while said follower engages one of said dwell regions of said cam.

8. The lost motion shift assembly of claim 7 further including an interaxle differential having an input coupled to said first output of said first clutch and a first output coupled to said first output of said second clutch and a second output coupled to said second output of said second clutch.

9. The lost motion shift assembly of claim 7 further including a planetary gear speed reduction assembly having an input coupled to one of said two drive members and an output coupled to the other of said two drive members.

10. The lost motion shift assembly of claim 7 wherein said second clutch is a friction clutch pack assembly.

11. The lost motion shift assembly of claim 7 wherein said drive member is a spur gear and said actuator includes a sector plate having gear teeth meshing with said spur gear.

12. The lost motion shift assembly of claim 7 wherein said actuator includes a pair of opposed members having aligned arcuate recesses and load transferring balls disposed in said recesses.

13. The lost motion shift assembly of claim 7 further including sensor means for providing a signal indicating the angular position of said shift rail.

14. A transfer case for a motor vehicle comprising, in combination, an input shaft, a speed reduction assembly driven by said input shaft and configured to provide a first, direct drive output and a second, reduced speed output, a first output member adapted to drive a first vehicle driveline, a second output member adapted to drive a second vehicle driveline, a first clutch for selectively engaging said first output member with one of said outputs of said speed reduction assembly, a second clutch for providing modulating engagement between said first output member and said second output member, a rotatable shift rail having at least one cam follower, a drive assembly for bi-directionally rotating said shift rail, a shift fork adapted to translate said first clutch, said shift fork disposed adjacent said cam follower and defining at least one cam having helical and dwell regions, a clutch actuator adapted to generate and apply compressive force to said second clutch, and a drive member secured to said shift rail, a gear having a pair of spaced apart shoulders engageable by said drive member and a sector plate coupled to said clutch actuator and meshing with said gear, whereby said clutch actuator is activated when said cam follower is in said dwell regions of said cam and released when said cam follower is in said helical region of said cam.

15. The transfer case of claim 14 wherein said speed reduction assembly is a planetary gear device having a carrier supporting a plurality of planet gears, said carrier providing said second, reduced speed output.

16. The transfer case of claim 14 further including a position sensor coupled to said shift rail for providing data indicating the angular position of said shift rail.

17. The transfer case of claim 14 wherein said drive assembly is an electric motor.

18. The transfer case of claim 14 wherein said clutch actuator includes a pair of members having a plurality of opposed arcuate recesses and a like plurality of load transferring balls in said recesses.

* * * * *